United States Patent
Yanobe et al.

(10) Patent No.: US 10,578,433 B2
(45) Date of Patent: Mar. 3, 2020

(54) INCLINATION SENSOR

(71) Applicant: TOPCON CORPORATION, Tokyo (JP)

(72) Inventors: Satoshi Yanobe, Tokyo (JP); Hideyuki Matsumoto, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 209 days.

(21) Appl. No.: 15/718,647

(22) Filed: Sep. 28, 2017

(65) Prior Publication Data

US 2018/0135981 A1 May 17, 2018

(30) Foreign Application Priority Data

Nov. 15, 2016 (JP) .................................. 2016-222424

(51) Int. Cl.
*G01C 9/06* (2006.01)
*G01C 9/18* (2006.01)

(52) U.S. Cl.
CPC .................. *G01C 9/06* (2013.01); *G01C 9/18* (2013.01); *G01C 2009/066* (2013.01)

(58) Field of Classification Search
CPC ........ G01C 9/06; G01C 9/18; G01C 2009/066
See application file for complete search history.

(56) References Cited

U.S. PATENT DOCUMENTS

| | | | |
|---|---|---|---|
| 2002/0138997 A1 | 10/2002 | Ohtomo et al. | |
| 2007/0081146 A1* | 4/2007 | Kumagai | G01C 9/06 356/139.1 |
| 2011/0031420 A1* | 2/2011 | Gotz | G01F 23/292 250/577 |
| 2017/0108333 A1* | 4/2017 | Kamiki | G01C 9/06 |
| 2017/0205233 A1* | 7/2017 | Momiyama | G01C 9/20 |

FOREIGN PATENT DOCUMENTS

JP 4712212 B 4/2011

* cited by examiner

*Primary Examiner* — Regis J Betsch
*Assistant Examiner* — Jeremy A Delozier
(74) *Attorney, Agent, or Firm* — Roberts Mlotkowski Safran Cole & Calderon P.C.

(57) ABSTRACT

To eliminate influences of unnecessary reflected light other than a liquid surface in a liquid surface reflection type inclination sensor. In order to attain the object described above, an inclination sensor includes a liquid that forms a liquid surface, an illumination section, a barcode pattern to be illuminated by the illumination section, an optical system that projects the barcode pattern on the liquid surface, a light receiving element that detects the barcode pattern, a storage section that stores a detection image when the liquid surface is removed from an optical path of the optical system, and an arithmetic section that calculates an inclination angle by subtracting the detection image when the liquid surface is removed from a detection image when the liquid surface is present on the optical path of the optical system.

4 Claims, 11 Drawing Sheets

INCLINATION SENSOR

TECHNICAL FIELD

The present invention relates to a liquid surface reflection type inclination sensor.

BACKGROUND ART

Generally, a surveying instrument includes an inclination sensor inside, and is leveled based on detection results of the inclination sensor. As this inclination sensor, a liquid surface reflection type is frequently used.

Figure 1:
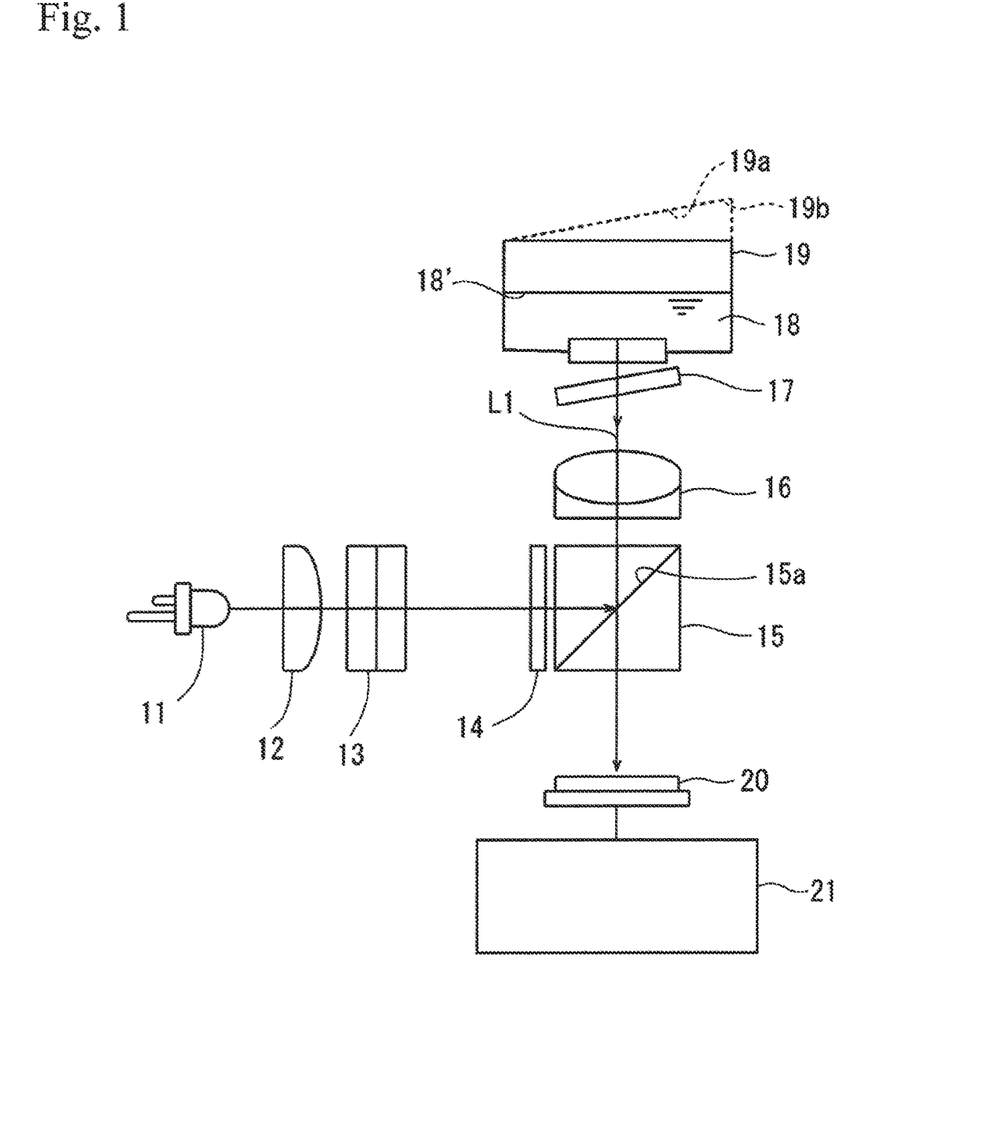
FIG. 1 is an optical configuration diagram of a liquid surface reflection type inclination sensor.

FIG. 1 is a configuration diagram of an optical system of a liquid surface reflection type inclination sensor. The liquid surface reflection type inclination sensor includes an illumination section 11, a collimating lens 12, a barcode pattern 13, a polarizer 14, a beam splitter 15, a focus lens 16, a $\lambda/4$ plate 17, a liquid 18, a container 19, a light receiving element 20, and an arithmetic processing unit 21. In the liquid surface reflection type inclination sensor, the liquid 18 is sealed in the container 19, light is irradiated onto the barcode pattern 13 from the illumination section 11 and reflected by the surface of the liquid 18 (free liquid surface following gravity, hereinafter, referred to as a liquid surface 18'), and this reflected light is received by the light receiving element 20, and a displacement amount of the detection image thereof is detected.

In the liquid surface reflection type inclination sensor, the reflectance of the liquid surface 18' is low, and most of a light flux incident on the liquid 18 is transmitted through the liquid surface 18', so that an error caused by an image reflected by the ceiling of the container 19 cannot be ignored in some cases. Therefore, in the inclination sensor described in Patent literature 1, by forming the ceiling of the container 19 into an inclined surface 19a (shown by the dashed line in FIG. 1), the reflected light on the ceiling is designed to deflect and prevent an unnecessary reflected light image from being received by the light receiving element 20.

CITATION LIST

Patent Literature

Patent Literature 1: Description (FIG. 9) of Japanese Patent No. 4712212

SUMMARY OF THE INVENTION

Technical Problem

However, it was found that if the ceiling of the container 19 was inclined as in the case of Patent Literature 1, when the inclination sensor inclined, a water bubble attached to the corner 19b (shown by the dashed line in FIG. 1) formed at an end portion of the inclined surface 19a, and an image reflected by this water bubble became an error in some cases. In addition, even if it is designed as in Patent Literature 1, reflection may occur on the surface of an optical component disposed on an optical path, such as the $\lambda/4$ plate 17, so that there is a problem in which influences of unnecessary reflected light other than the liquid surface 18' cannot be completely eliminated.

An object of the prevent invention is to provide a liquid surface reflection type inclination sensor that eliminates influences of unnecessary reflected light other than a liquid surface.

Solution to Problem

In order to solve the above-described problem, an inclination sensor according to an embodiment of the present invention includes a liquid that forms a liquid surface, an illumination section, a barcode pattern to be illuminated by the illumination section, an optical system that projects the barcode pattern on the liquid surface, a light receiving element that detects the barcode pattern reflected, a storage section that stores a detection image of the light receiving element when the liquid surface is removed from an optical path of the optical system, and an arithmetic section that calculates an inclination angle by subtracting a detection image when the liquid surface is removed from a detection image of the light receiving element when the liquid surface is present on the optical path of the optical system.

In the embodiment described above, it is also preferable that the inclination sensor includes an illumination control section that adjusts a light amount of the illumination section, and the storage section stores an illumination control value of the illumination control section for a detection image when the liquid surface is removed, and the arithmetic section makes an illumination control value of the detection image when the liquid surface is removed and an illumination control value of the detection image when the liquid surface is present, equal to each other.

In the embodiment described above, it is also preferable that the arithmetic section makes the storage section store a detection image and an illumination control value when the liquid surface is present, and acquires a detection image when the liquid surface is removed at the illumination control value when the liquid surface is present.

In the embodiment described above, it is also preferable that the storage section stores pluralities of detection images and illumination control values when the liquid surface is removed, and the arithmetic section reads, from the storage section, a detection image when the liquid surface is removed at an illumination control value equal to an illumination control value of a detection image when the liquid surfaced is present.

In the embodiment described above, it is also preferable that the storage section stores detection images and illumination control values when the liquid surface is removed, with different two light amounts, and the arithmetic section predicts a detection image when the liquid surface is removed at an illumination control value equal to an illumination control value of a detection image when the liquid surface is present, by utilizing a proportional relationship between an illumination control value of the illumination control section and a maximum light amount of a detection image of the light receiving section.

Effect of the Invention

By the inclination sensor according to the present invention, influences of unnecessary reflected light other than a liquid surface can be eliminated.

DESCRIPTION OF EMBODIMENTS

Preferred embodiments of the present invention are described with reference to the drawings.

Configurations of optical elements of a liquid surface reflection type inclination sensor 10 (hereinafter, referred to as inclination sensor 10, simply) according to an embodiment are the same as in FIG. 1. The inclination sensor 10 includes an illumination section 11, a collimating lens 12, a barcode pattern 13, a polarizer 14, a beam splitter 15, a focus lens 16, a λ/4 plate 17, a liquid 18, a container 19, a light receiving element 20, and an arithmetic processing unit 21. The λ/4 plate 17 and the polarizer 14 are provided to exclude a light flux reflected in an undesired direction, and are arbitrary components. Also, the layout of the optical elements shown in the drawings is an example. It is allowed to configure the optical elements shown in the drawings by other optical elements, and add other optical elements. In addition, the inclination sensor 10 may be configured so that a light flux is made incident from above the liquid 18 or from a direction inclined with respect to the liquid surface 18'.

The illumination section 11 is a light source, for example, an LED, etc. The collimating lens 12 collimates and outputs a light flux from the illumination section 11. The barcode pattern 13 includes (reflected as in FIG. 3 below) an absolute pattern consisting of a number of slits 13b arrayed in an X-axis direction and a Y-axis direction orthogonal to each other in a black mask portion. The polarizer 14 s-polarizes a light flux that passed through the barcode pattern 13, with respect to the beam splitter 15. The beam splitter 15 has a semi-transmissive surface 15a, and reflects a light flux that passed through the polarizer 14 toward the liquid 18. The focus lens 16 focuses the light reflected by the beam splitter 15. The λ/4 plate 17 provides a phase difference to the light flux that passed through the focus lens 16. The light flux that passed through the λ/4 plate 17 enters the liquid 18 sealed inside a tubular container 19, and is reflected by the liquid surface 18' of the liquid 18. As the liquid 18, for example, silicone oil, a fluorine-based liquid, etc., is used.

The light flux reflected by the liquid surface 18' is transmitted through the λ/4 plate 17, the focus lens 16, and the beam splitter 15 again, and is received by the light receiving element 20. As the light receiving element 20, for example, an image sensor or a two-dimensional area sensor is used. In the light receiving element 20, a part of the barcode pattern 13 is reflected, and specific patterns Pij (i means a column in the X direction, and is an integer from 1 to J, and j means a row in the Y direction, and is an integer from 1 to K) are detected.

A detection image detected by the light receiving element 20 is subjected to image analysis by the arithmetic processing unit 21. The arithmetic processing unit 21 is a microcontroller in which, for example, a CPU (arithmetic section 21a), a RAM, and a ROM (storage section 21b), etc., are mounted on an integrated circuit. The arithmetic processing unit 21 detects the specific patterns Pij from the detection image of the light receiving element 20, and sums the specific patterns Pij in each of the X direction and the Y direction to obtain a light amount distribution Xi and a light amount distribution Yj. From the arrangement of the pattern images (widths) of the light amount distributions Xi and Yj, the positions (portions) of the detected specific patterns Pij are identified, and by Fourier transform of the light amount distributions Xi and Yj, a phase in pattern pitches is calculated. Then, from the positions of the specific patterns Pij and the phase in the pattern pitches, displacement amounts of the specific patterns Pij are obtained, and based on the displacement amounts, an inclination angle is operated.

Figure 2:
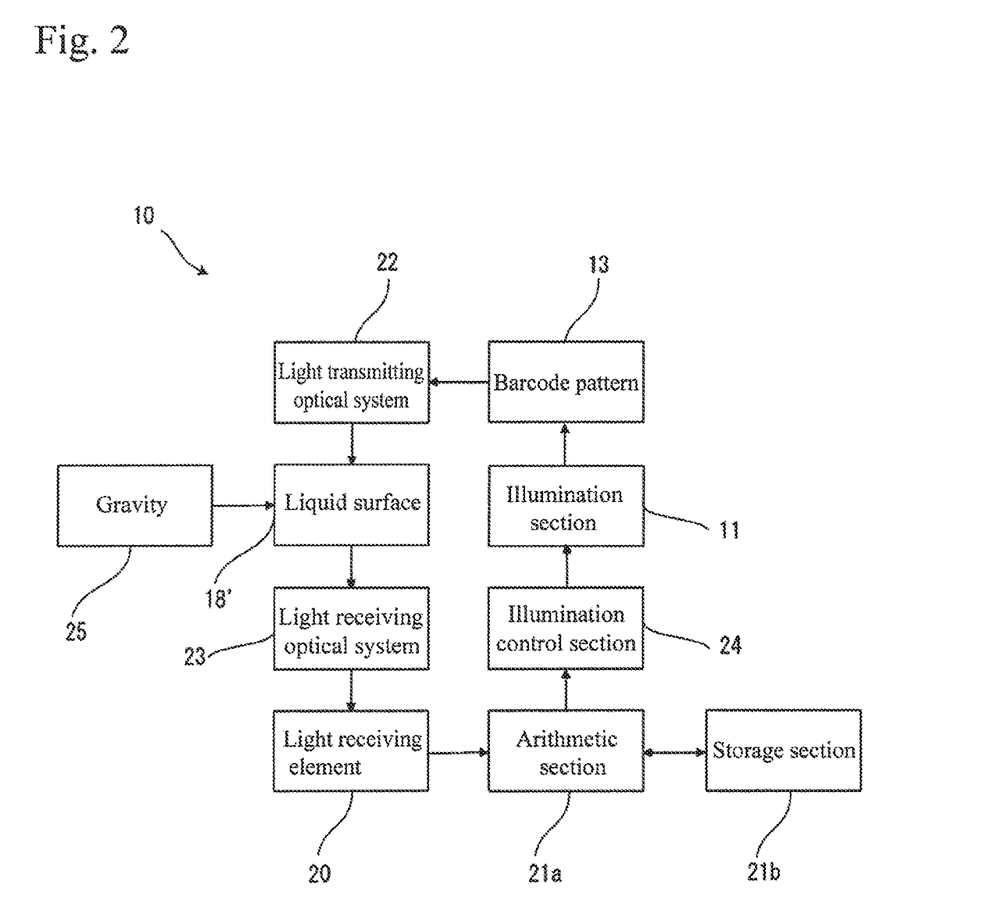
FIG. 2 is a configuration block diagram of an inclination sensor according to the present embodiment.

FIG. 2 is a configuration block diagram of the inclination sensor 10 according to the present embodiment. The inclination sensor 10 includes the above-described illumination section 11, the barcode pattern 13, the light transmitting optical system 22 (the collimating lens 12, the polarizer 14, the beam splitter 15, the focus lens 16, and the λ/4 plate 17) that projects the barcode pattern 13 on the liquid surface 18', the liquid surface 18', the light receiving optical system 23 (the λ/4 plate 17, the focus lens 16, and the beam splitter 15), the light receiving element 20, the arithmetic section 21a, and the storage section 21b, and further includes an illumination control section 24.

The liquid surface 18' maintains a horizontal liquid surface following gravity 25 with respect to an inclination of a surveying instrument (inclination sensor 10). The illumination control section 24 is, for example, a digital potentiometer, and increases/decreases a load on the illumination section 11 by a combined resistance value of a fixed resistance and a variable resistance based on a control signal from the arithmetic section 21a to control a light emission amount of the illumination section 11 in a plurality of stages. The arithmetic section 21a A/D converts an output from the light receiving element 20, and when the output level of the signal is smaller than a prescribed value, lowers a resistance value of the digital potentiometer to increase the light emission amount, and when the output level is larger than the prescribed value, raises the resistance value to decrease the light emission amount, whereby controlling an illumination control value of the illumination control section 24 so as to obtain a proper light amount. Besides this, the illumination control section 24 may be configured to perform PWM control, configured as a low dropout voltage regulator (LDO), or configured to switch a plurality of fixed resistances with different resistance values.

Figure 3:
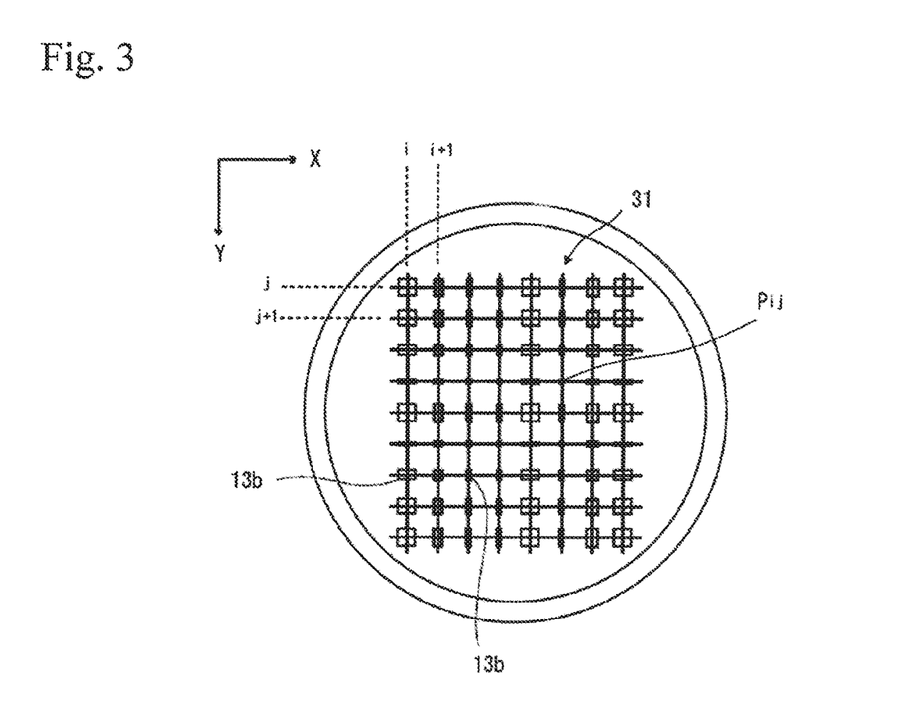
FIG. 3 is an example of a detection image when a liquid surface is present on an optical path.

Here, FIG. 3 is an example of a detection image when the liquid surface 18' is present on the optical path L1. In the inclination sensor 10, normally, the liquid surface 18' is present on the optical path L1 (refer to FIG. 1) of the light transmitting optical system 22 and the light receiving optical system 23. When a light flux that passed through the barcode pattern 13 is reflected by the liquid surface 18', in the light receiving element 20, the barcode pattern 13 is projected so as to fit inside the area of the light receiving element 20

(detection image 31 when the liquid surface is present on the optical path), for example, as shown in FIG. 3.

Figure 4:
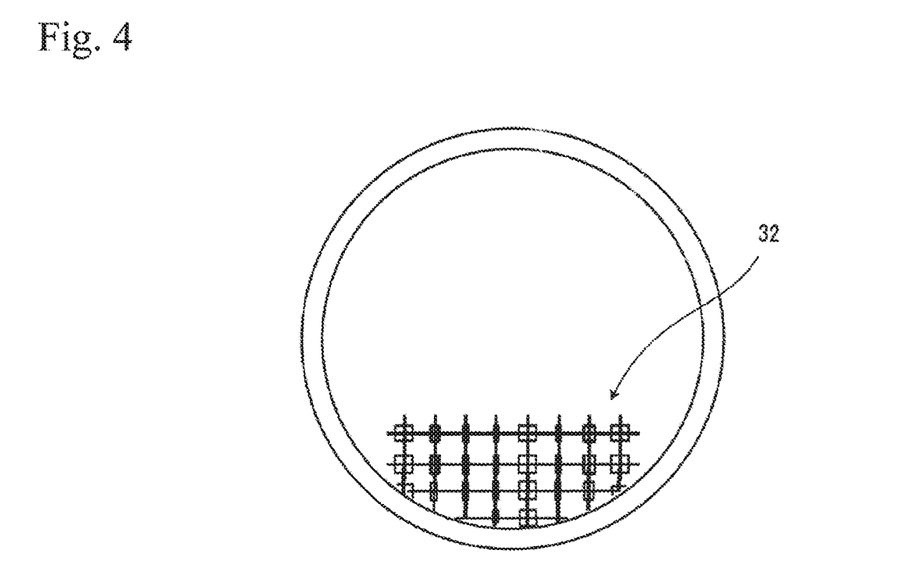
FIG. 4 is an example of a detection image when a liquid surface is removed from the optical path.

On the other hand, FIG. 4 is an example of a detection image when the liquid surface 18' is removed from the optical path L1. When the liquid surface 18' is absent on the optical path L1 of the inclination sensor 10, for example, as shown in FIG. 4, a pattern of a part of the barcode pattern 13 may be reflected (detection image 32 when the liquid surface is removed from the optical path).

The detection image 32 shown in FIG. 4 is unnecessary reflected light considered to have been reflected by the ceiling of the container 19 or an optical element such as the λ/4 plate 17. The detection image 32 of such unnecessary reflected light is superimposed on and reflected in the detection image 31 reflected by the liquid surface 18', and becomes a factor for an error of image analysis of the arithmetic processing unit 21.

Therefore, in the inclination sensor 10 according to the present embodiment, the detection image 32 of unnecessary reflected light is stored, and influences of the image 32 are eliminated.

Figure 5:
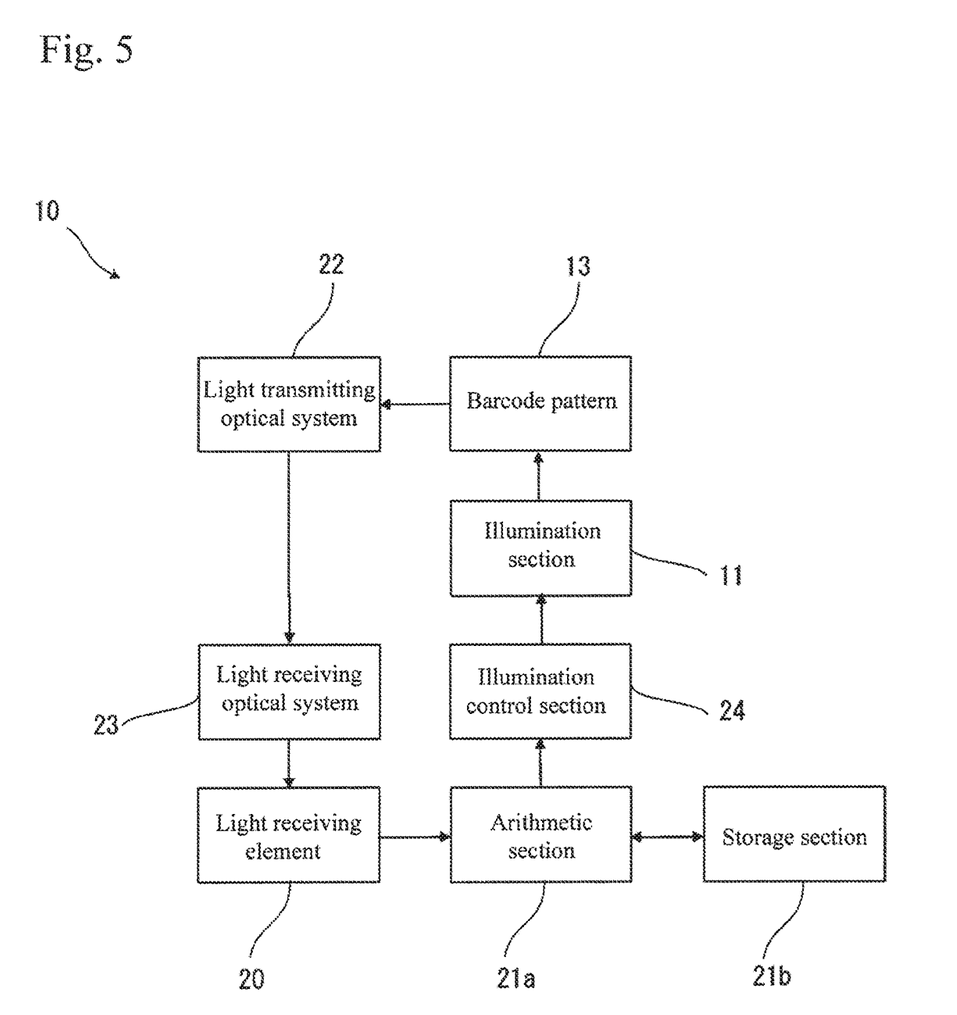
FIG. 5 is a configuration block diagram of the inclination sensor according to the present embodiment when acquiring unnecessary reflected light.

FIG. 5 is a configuration block diagram of the inclination sensor 10 according to the present embodiment when acquiring unnecessary reflected light. Before the liquid 18 is sealed in the inclination sensor 10, or when the inclination sensor 10 is inclined into a substantially vertical state while the liquid 18 is sealed therein, the liquid surface 18' is removed from the optical path L1 of the light transmitting optical system 22 and the light receiving optical system 23, and the configuration shown in FIG. 5 is accordingly created. The inclination sensor 10 acquires the detection image 32 of unnecessary reflected light and eliminates influences of the detection image 32 by any of the following processes.

First Embodiment

Figure 6:
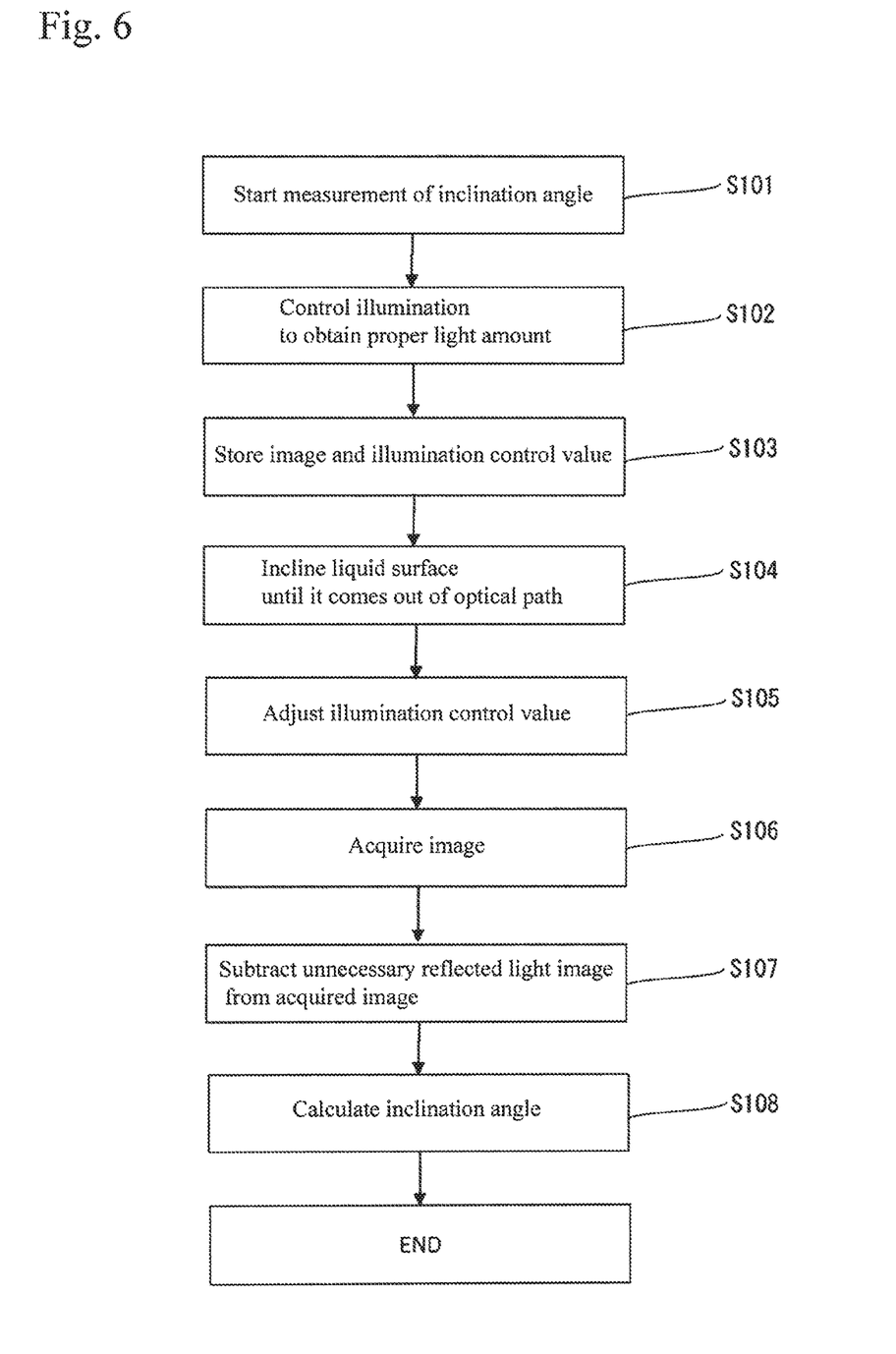
FIG. 6 is a flowchart of processing according to a first embodiment.

FIG. 6 is a flowchart of processing according to a first embodiment. In the first embodiment, when the process shifts to Step S101, inclination angle measurement is started as per normal.

Next, the process shifts to Step S102, and to make the light amount of the illumination section 11 proper for the light receiving element 20, the illumination control value of the illumination control section 24 is controlled and the light amount of the illumination section 11 is adjusted.

Next, the process shifts to Step S103, and a detection image 31 (detection image when the liquid surface is present) with a proper light amount is acquired, and stored together with the illumination control value of Step S102.

Next, the process shifts to Step S104, and by inclining the inclination sensor 10 until the liquid surface 18' comes out of the optical path L1, the liquid surface 18' is removed.

Next, the process shifts to Step S105, and the illumination control value of the illumination control section 24 is adjusted to be equal to the illumination control value stored in Step S103.

Next, the process shifts to Step S106, and a detection image 32 (detection image when the liquid surface is removed) is acquired and stored.

Next, the process shifts to Step S107, and the detection image 32 is subtracted from the detection image 31.

Next, the process shifts to Step S108, and from a phase difference from a reference position of a light amount distribution, an inclination angle is calculated, and the process ends.

In the first embodiment, first, the detection image 31 when the liquid surface is present is acquired, and at the illumination control value when acquiring the detection image 31, the detection image 32 when the liquid surface is removed is acquired. According to the first embodiment, adjustment of the illumination control value (Step S105) when the liquid surface 18' is removed is simple.

Second Embodiment

Figure 7:
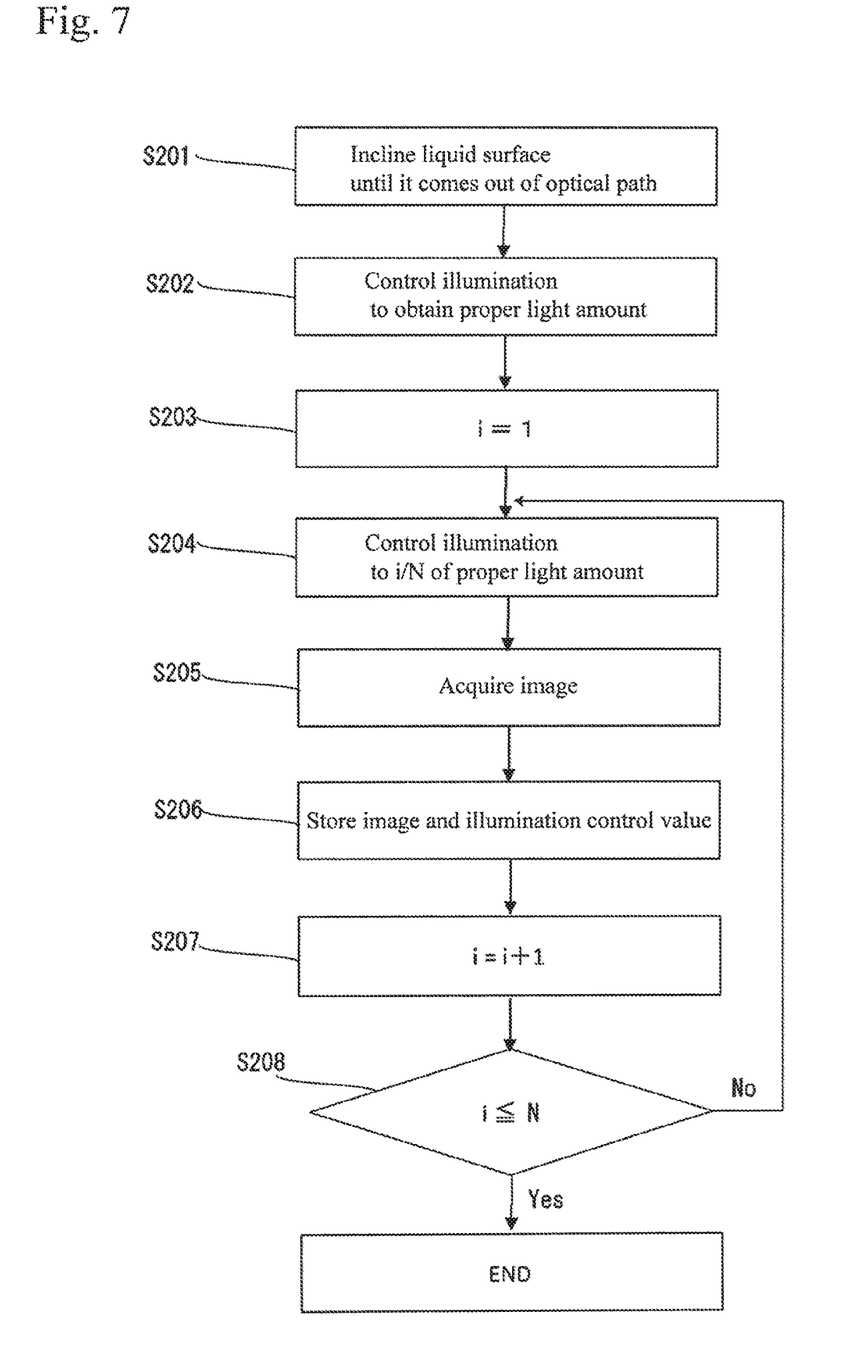
FIG. 7 is a flowchart of processing to acquire an unnecessary reflected light image according to a second embodiment.
Figure 8:
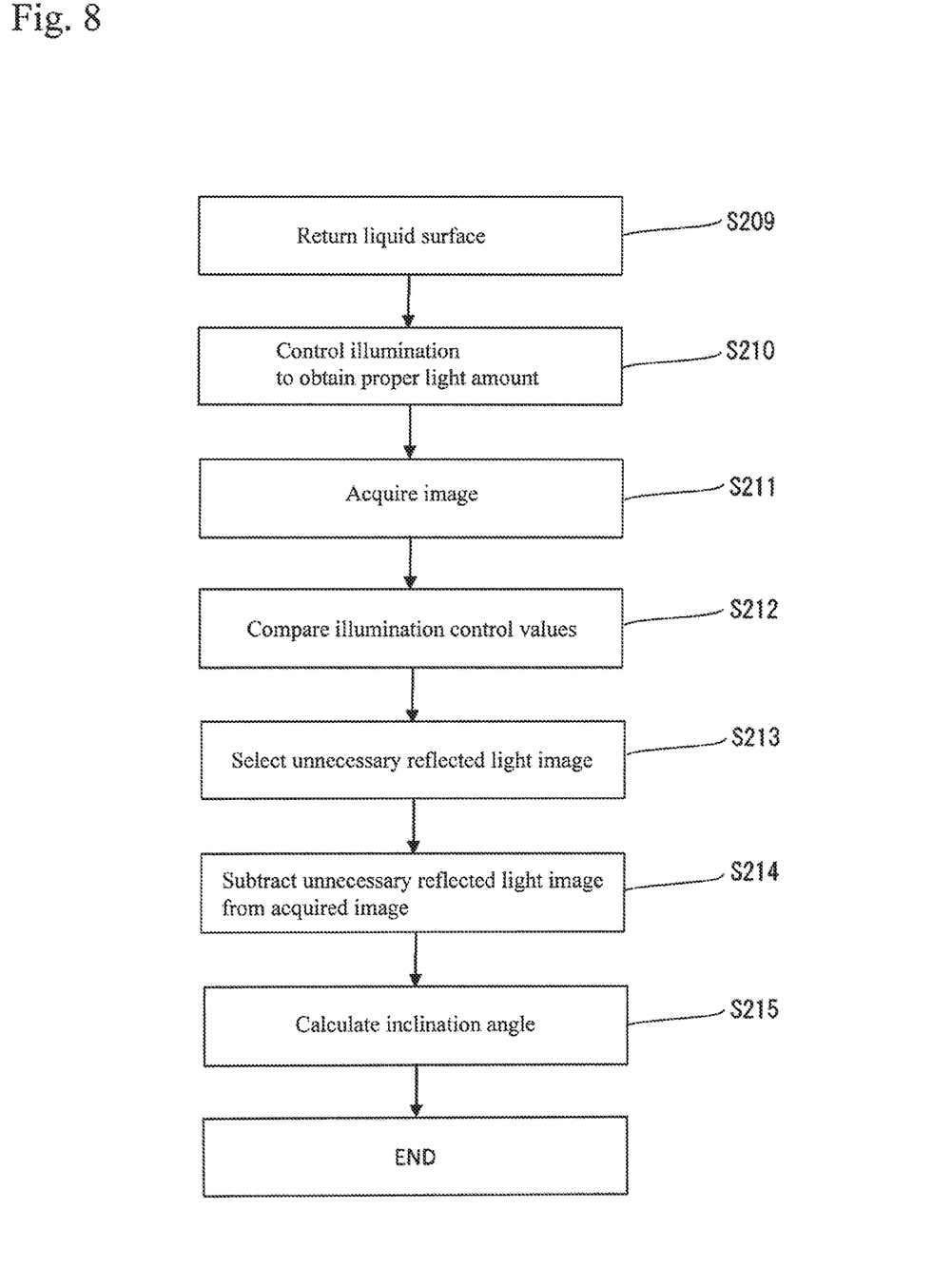
FIG. 8 is a flowchart of processing to calculate an inclination angle according to the second embodiment.

FIG. 7 is a flowchart of processing to acquire an unnecessary reflected light image according to a second embodiment, and FIG. 8 is a flowchart of processing to calculate an inclination angle according to the second embodiment.

As shown in FIG. 7, in the second embodiment, when the process shifts to Step S201, the liquid surface 18' is removed from the optical path L1 by inclining the inclination sensor 10 until the liquid surface 18' comes out of the optical path L1.

Next, the process shifts to Step S202, and to obtain a proper light amount, the illumination control value of the illumination control section 24 is adjusted, and the light amount of the illumination section 11 is adjusted.

Next, the process shifts to Step S203, and a count value i=1 is set.

Next, the process shifts to Step S204, and the illumination control value of the illumination control section 24 is controlled so as to become i/N of the proper light amount (N is an arbitrarily set number of acquisitions of the detection image 32).

Next, the process shifts to Step S205, and the detection image 32 (detection image when the liquid surface is removed) is acquired.

Next, the process shifts to Step S206, and the illumination control value of Step S204 and the detection image 32 of Step S205 are stored.

Next, the process shifts to Step S207, and the count value of Step S103 is incremented by one (i=i+1).

Next, the process shifts to Step S208, and whether the control of the illumination control section 24 has been performed at all stages (1/N, 2/N, 3/N, 4/N, . . . , N−1/N, N/N) is determined (i≤N). When it is not performed at all stages (No), the process returns to Step S204. When it was performed at all stages (Yes), the process ends.

When measuring an inclination angle, the process shown in FIG. 8 is performed. First, the process shifts to Step S209, and the inclination of the inclination sensor 10 is changed to be horizontal to make the liquid surface 18' present on the optical path L1.

Next, the process shifts to Step S210, and to obtain a proper light amount, the illumination control value of the illumination control section 24 is controlled and the light amount of the illumination section 11 is adjusted.

Next, the process shifts to Step S211, and a detection image 31 with the proper light amount when the liquid surface is present is acquired, and stored together with the illumination control value.

Next, the process shifts to Step S212, and the illumination control value of Step S204 (when the liquid surface is removed) and the illumination control value of Step S211 (when the liquid surface is present) are compared.

Next, the process shifts to Step S213, and among the plurality of detection images 32 acquired in Steps S204 to S208 of FIG. 7 and stored in the storage section 21b, a detection image 32 acquired at an illumination control value equal to the illumination control value of Step S211 is readout.

Next, the process shifts to Step S214, and the readout detection image 32 is subtracted from the detection image 31.

Next, the process shifts to Step S215, and from a phase difference from a reference position of the light amount distribution, an inclination angle is calculated, and the process ends.

In the second embodiment, at the stage of manufacturing or before inclination angle measurement, concerning light amounts to which the illumination control section 24 can make adjustment, a plurality of detection images 32 when the liquid surface is removed are stored. Then, at the time of inclination angle measurement, a detection image 32 when the liquid surface is removed at an illumination control value equal to an illumination control value of the measured detection image (detection image 31 when the liquid surface is present) is readout from the storage section 21b. According to the second embodiment, by storing a plurality of detection images 32 in advance, it becomes easy to adjust the illumination control value (Step S213) at the time of inclination angle measurement.

Third Embodiment

Figure 9:
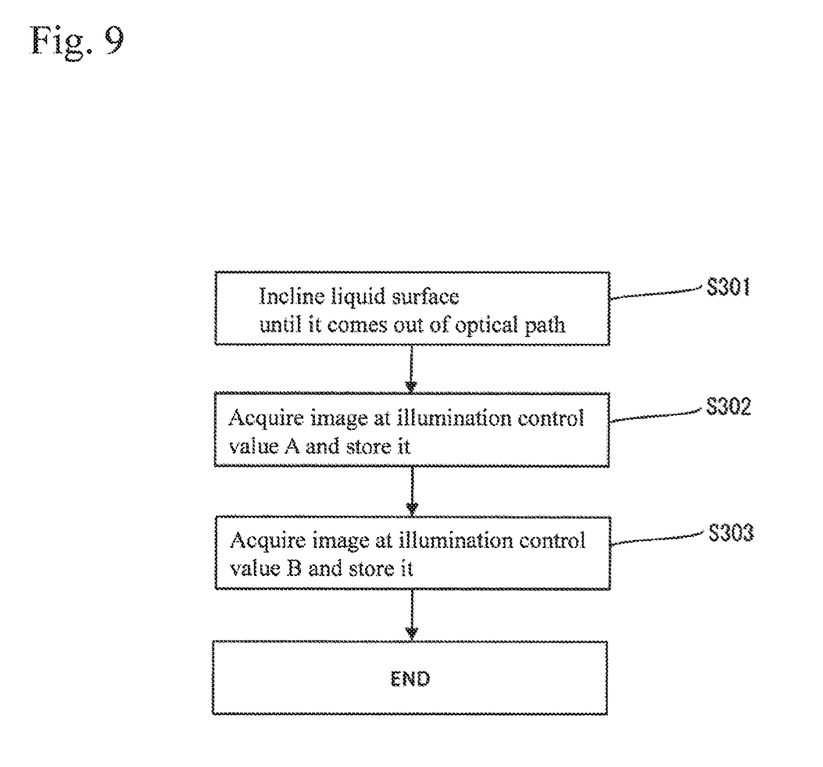
FIG. 9 is a flowchart of processing to acquire an unnecessary reflected light image according to a third embodiment.
Figure 10:
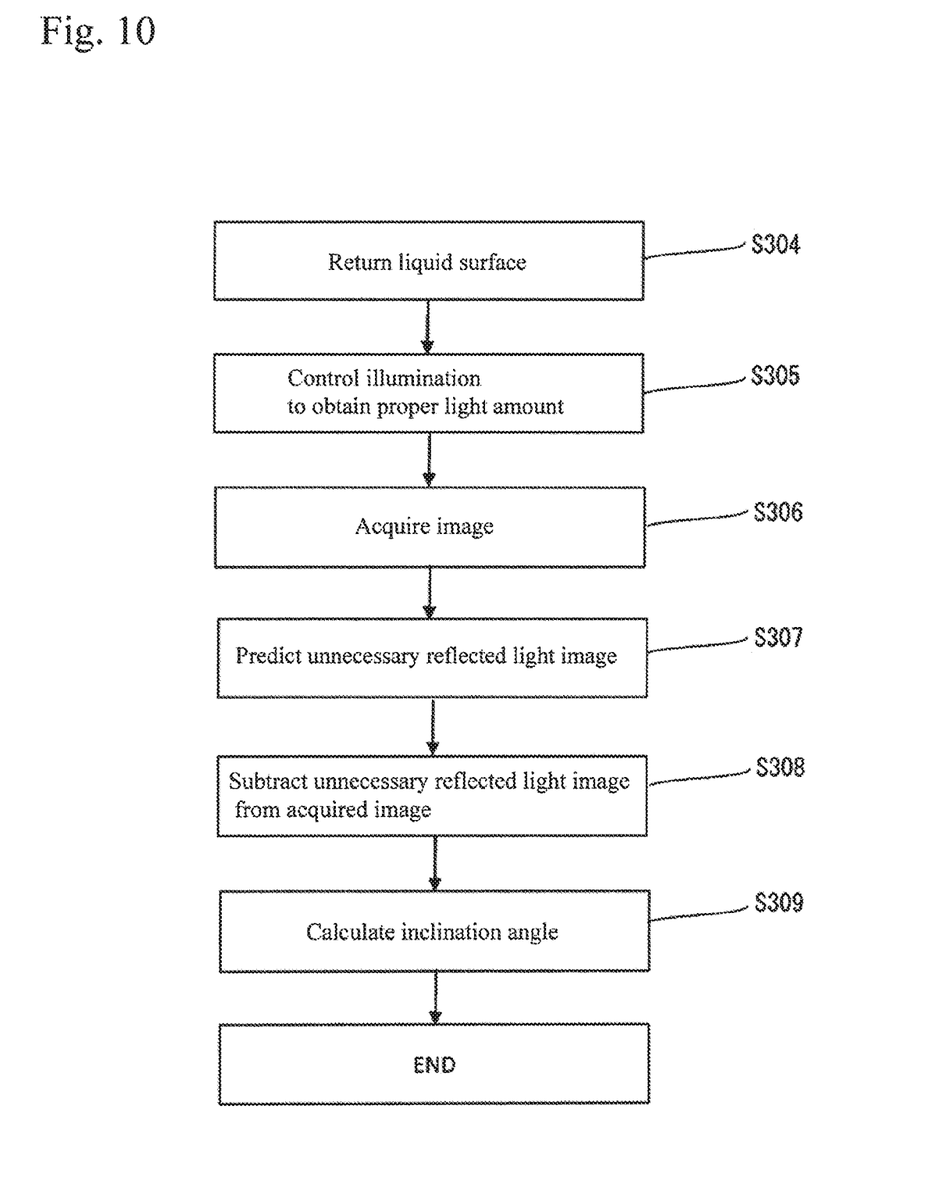
FIG. 10 is a flowchart of processing to calculate an inclination angle according to the third embodiment.

FIG. 9 is a flowchart of processing to acquire an unnecessary reflected light image according to a third embodiment, and FIG. 10 is a flowchart of processing to calculate an inclination angle according to the third embodiment. Even in the third embodiment, first, the processing to acquire an unnecessary reflected light image is performed.

As shown in FIG. 9, first, the process shifts to Step S301, and in the same manner as in Step S201 of the second embodiment, the liquid surface 18' is removed from the optical path L1.

Next, the process shifts to Step S302, and at an arbitrary illumination control value A, a detection image 32A when the liquid surface is removed is acquired, and stored together with the illumination control value A.

Next, the process shifts to Step S303, and at an arbitrary illumination control value B (A<B), a detection image 32B when the liquid surface is removed is acquired, and stored together with the illumination control value B, and then the process ends.

At the time of measurement of an inclination angle, the process shown in FIG. 10 is performed. First, the process shifts to Step S304, and in the same manner as in Step S209 of the second embodiment, the liquid surface 18' is returned onto the optical path L1.

Next, the process shifts to Step S305, and to obtain a proper light amount, the illumination control value of the illumination control section 24 is controlled, and the light amount of the illumination section 11 is adjusted.

Next, the process shifts to Step S306, and a detection image 31 with a proper light amount when the liquid surface is present is acquired, and stored together with the illumination control value.

Next, the process shifts to Step S307, and a detection image 32 when the liquid surface is removed, obtained at an illumination control value equal to the illumination control value when the liquid surface is present in Step S306, is predicted.

Figure 11:
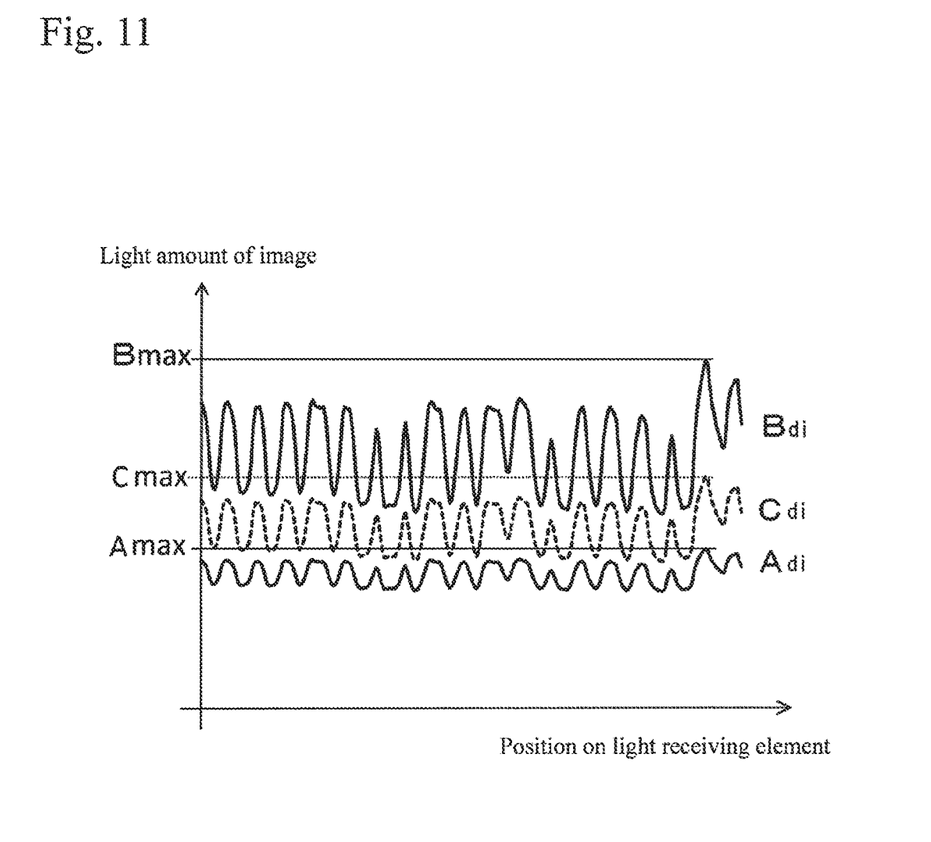
FIG. 11 is a diagram showing an example of light amount distributions of detection images.
Figure 12:
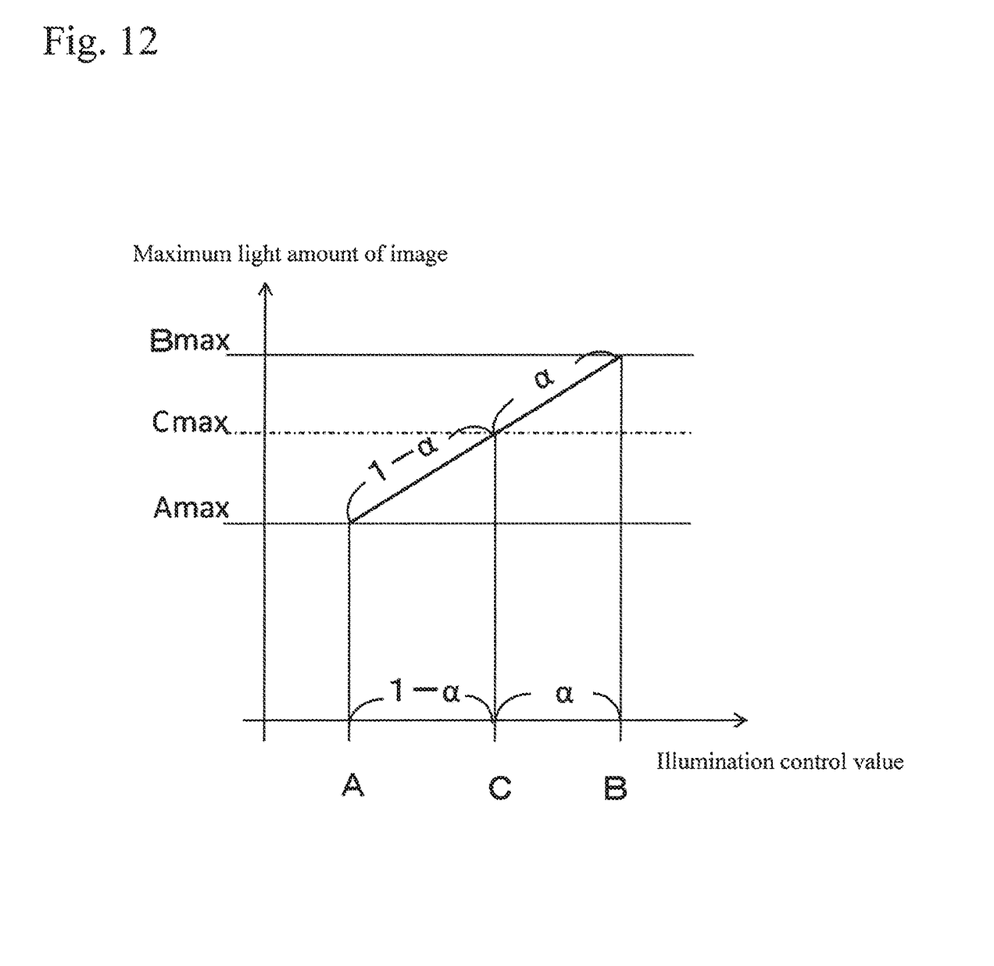
FIG. 12 is a diagram showing an example of prediction of an illumination control value.

The prediction in Step S307 is described in detail. FIG. 11 is a diagram showing light amount distributions of detection images 32A and 32B, and FIG. 12 is a diagram showing an example of prediction of an illumination control value. In FIG. 11, the horizontal axis shows a position in the X direction on the light receiving element 20, and the vertical axis shows a light amount of the detection image 32 detected by the light receiving element 20. The respective detection images 32A and 32B at the illumination control values A and B (A<B) are distributed (solid lines), for example, as shown in FIG. 11. The light amount distribution $B_{di}$ at the illumination control value B has substantially the same shape as the light amount distribution $A_{di}$ at the illumination control value A in the horizontal axis direction, and is higher in light amount than the light amount distribution $A_{di}$ in the vertical axis direction. Thus, the illumination control value and the light amount bear a proportionate relationship to each other. Therefore, when the illumination control value is plotted on the horizontal axis, and the maximum light amount of the detection image 32 is plotted on the vertical axis, a maximum light amount $C_{MAX}$ at the illumination control value C (A<C<B) can be predicted. For example, as shown in FIG. 12, when a ratio α (0<α<1) obtained by summing the illumination control value A and the illumination control value B is set, the following expression is obtained:

$$\text{Illumination control value } C = \alpha(\text{illumination control value } A) + (1-\alpha)(\text{illumination control value } B) \quad (1)$$

From the expression (1), $$\alpha = (\text{illumination control value } C - \text{illumination control value } B)/(\text{illumination control value } A - \text{illumination control value } B) \quad (2)$$

is obtained, and the maximum light amount $C_{MAX}$ at the illumination control value C is obtained as:

$$\text{Maximum light amount } C_{MAX} = \alpha(\text{maximum light amount } A_{MAX}) + (1-\alpha)(\text{maximum light amount } B_{MAX}) \quad (3)$$

By utilizing this, in the same manner, a light amount distribution $C_{di}$ at the illumination control value C can also be predicted as:

$$\text{Light amount distribution } C_{di} = \alpha(\text{light amount distribution } A_{di}) + (1-\alpha)(\text{light amount distribution } B_{di}) \quad (4)$$

Next, the process shifts to Step S309, and the predicted detection image 32 is subtracted from the detection image 31.

Next, the process shifts to Step S310, and from a phase difference from a reference position of the light amount distribution, an inclination angle is calculated, and then the process ends.

In the third embodiment, at the stage of manufacturing or before inclination angle measurement, the illumination control section 24 stores detection images 32 when the liquid surface is removed, with at least two light amounts (A, B) among light amounts to which the illumination control section 24 can make adjustment. Then, at the time of measurement of an inclination angle, by utilizing the proportional relationship between the illumination control value of the illumination control section 24 and the maximum light amount of the detection image 32 of the light receiving element 20, a detection image 32 when the liquid surface is removed, corresponding to the illumination control value of the detection image 31 when the liquid surface is present, is predicted. According to the third embodiment, the detection image 32 when the liquid surface is removed is obtained by prediction at the time of measurement of an inclination angle, so that the time and effort at the stage of manufacturing and the capacity of the storage section 21b can be reduced, and the process can be rationalized.

In the third embodiment, when the illumination control value A is set to a light amount at which a maximum light amount of unnecessary reflected light becomes a proper light amount, and the illumination control value B is set to a light amount at which the maximum light amount of unnecessary reflected light becomes ½ of a proper light amount (or the illumination control value when the maximum light amount of unnecessary reflected light becomes a proper light amount becomes ½), accuracy of the proportional expression is improved, and this is preferable.

As described above, according to the inclination sensor 10 of the present embodiments, influences of unnecessary reflected light (detection image 32) other than the liquid surface 18' can be eliminated.

In the embodiments 1 to 3 described above, adjustment is made so that illumination control values when the liquid surface 18' is present and when the liquid surface 18' is removed are made equal to each other, however, even in the state where the two illumination control values are different from each other, by subtracting the detection image 32 when the liquid surface is removed from the detection image 31 when the liquid surface is present, an effect of reducing an error caused by influences of unnecessary reflected light is obtained. Preferably, as described in the embodiments 1 to 3 above, by performing image processing after adjusting the illumination control value, an error caused by influences of unnecessary reflected light can be further reduced.

Preferred embodiments and modifications of the present invention are described above, and each embodiment and each modification can be combined based on the knowledge of a person skilled in the art, and such a combined embodiment is included in the scope of the present invention.

REFERENCE SIGNS LIST

10 Inclination sensor
11 Illumination section
18 Liquid
18' Liquid surface
19 Container
20 Light receiving element
21 Arithmetic processing unit
21*a* Arithmetic section
21*b* Storage section
22 Light transmitting optical system
23 Light receiving optical system
24 Illumination control section
31 Detection image when the liquid surface is present on the optical path
32 Detection image when the liquid surface is removed from the optical path

The invention claimed is:

1. An inclination sensor comprising:
a liquid that forms a liquid surface;
an illumination section;
a barcode pattern to be illuminated by the illumination section;
an optical system that projects the barcode pattern on the liquid surface;
a light receiving element that detects the barcode pattern reflected; a storage section that stores a detection image of the light receiving element when the liquid surface is removed from an optical path of the optical system; and
an arithmetic section that calculates an inclination angle by subtracting a detection image when the liquid surface is removed from a detection image of the light receiving element when the liquid surface is present on the optical path of the optical system,
wherein the inclination sensor includes an illumination control section that adjusts a light amount of the illumination section, the storage section stores an illumination control value of the illumination control section for a detection image when the liquid surface is removed, and the arithmetic section makes an illumination control value of the detection image when the liquid surface is removed and an illumination control value of the detection image when the liquid surface is present, equal to each other.

2. The inclination sensor according to claim 1, wherein the arithmetic section makes the storage section store a detection image and an illumination control value when the liquid surface is present, and acquires a detection image when the liquid surface is removed at the illumination control value when the liquid surface is present.

3. The inclination sensor according to claim 1, wherein the storage section stores pluralities of detection images and illumination control values when the liquid surface is removed, and the arithmetic section reads, from the storage section, a detection image when the liquid surface is removed at an illumination control value equal to an illumination control value of a detection image when the liquid surface is present.

4. The inclination sensor according to claim 1, wherein the storage section stores detection images and illumination control values when the liquid surface is removed, with different two light amounts, and the arithmetic section predicts a detection image when the liquid surface is removed at an illumination control value equal to an illumination control value of a detection image when the liquid surface is present, by utilizing a proportional relationship between an illumination control value of the illumination control section and a maximum light amount of a detection image of the light receiving section.

* * * * *